United States Patent
Aoyanagi et al.

(10) Patent No.: US 11,859,645 B2
(45) Date of Patent: Jan. 2, 2024

(54) VEHICLE INCLUDING EMBOSSED SURFACE FOR IMPROVING AERODYNAMIC CHARACTERISTICS, AND FRONT BUMPER MEMBER

(71) Applicants: SUBARU CORPORATION, Tokyo (JP); TOYOTA JIDOSHA KABUSHIKI KAISHA, Toyota (JP)

(72) Inventors: Hiroki Aoyanagi, Tokyo (JP); Hideki Hata, Tokyo (JP); Masaya Sato, Tokyo (JP)

(73) Assignees: SUBARU CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 117 days.

(21) Appl. No.: 17/526,579

(22) Filed: Nov. 15, 2021

(65) Prior Publication Data
US 2022/0154744 A1    May 19, 2022

(30) Foreign Application Priority Data

Nov. 17, 2020   (JP) ................................. 2020-190672

(51) Int. Cl.
| | |
|---|---|
| F15D 1/00 | (2006.01) |
| F15D 1/12 | (2006.01) |
| B62D 37/02 | (2006.01) |
| B62D 35/00 | (2006.01) |

(52) U.S. Cl.
CPC ........... *F15D 1/005* (2013.01); *B62D 35/007* (2013.01); *B62D 37/02* (2013.01); *F15D 1/12* (2013.01)

(58) Field of Classification Search
CPC . F15D 1/005; F15D 1/12; F15D 1/004; B62D 35/007; B62D 37/02; B62D 35/005; Y02T 10/82
See application file for complete search history.

(56) References Cited

U.S. PATENT DOCUMENTS

| 1,573,326 | A | * | 2/1926 | Ohme ..................... B60R 19/18 |
|---|---|---|---|---|
| | | | | 293/142 |
| 9,482,096 | B1 | * | 11/2016 | Paesano .................. F01D 5/141 |
| 2006/0134379 | A1 | | 6/2006 | Pulkka |
| 2010/0159204 | A1 | | 6/2010 | Van Merksteijn |

(Continued)

FOREIGN PATENT DOCUMENTS

| GB | 2555823 A | * | 5/2018 | ........... B62D 25/085 |
|---|---|---|---|---|
| JP | 2001-050215 A | | 2/2001 | |

(Continued)

OTHER PUBLICATIONS

Japanese Office Action, dated Sep. 20, 2022, in Japanese Application No. 2020-190672 and English Translation thereof.

*Primary Examiner* — Lori Lyjak
(74) *Attorney, Agent, or Firm* — McGinn IP Law Group, PLLC

(57) ABSTRACT

A vehicle including an embossed surface for improving aerodynamic characteristics includes a front bumper member provided at a lower portion of a front surface of a vehicle body of the vehicle. On a surface of a side surface portion of the front bumper member, the embossed surface having a directional pattern for assisting an airflow to direct in one direction along the surface is formed. The one direction is raised rearward relative to a front-rear direction of the vehicle body.

18 Claims, 6 Drawing Sheets

(56) References Cited

U.S. PATENT DOCUMENTS

| | | | | |
|---|---|---|---|---|
| 2019/0203747 A1* | 7/2019 | Van Nesselrooij | ..... | F15D 1/003 |
| 2020/0063765 A1* | 2/2020 | Dalmas, II | ............. | F15D 1/005 |
| 2020/0271490 A1* | 8/2020 | Valentine | ................ | G01F 1/584 |
| 2021/0071691 A1 | 3/2021 | Takizawa | | |

FOREIGN PATENT DOCUMENTS

| | | | | |
|---|---|---|---|---|
| JP | 2009-504474 A | 2/2009 | | |
| JP | 2015-166212 A | 9/2015 | | |
| JP | 2015-182496 A | 10/2015 | | |
| JP | 6435434 B1 | 12/2018 | | |
| JP | 2019-108111 A | 7/2019 | | |
| WO | WO-2004089741 A1 * | 10/2004 | ............. | A41D 31/04 |

* cited by examiner

VEHICLE INCLUDING EMBOSSED SURFACE FOR IMPROVING AERODYNAMIC CHARACTERISTICS, AND FRONT BUMPER MEMBER

CROSS-REFERENCE TO RELATED APPLICATIONS

This application is based on and claims priority under 35 USC 119 from Japanese Patent Application No. 2020-190672 filed on Nov. 17, 2020, the contents of which are incorporated herein by reference.

The present disclosure relates to a vehicle including an embossed surface for improving aerodynamic characteristics of the vehicle, and a front bumper member.

A vehicle such as an automobile has a vehicle body, as disclosed for example in Japanese Unexamined Patent Application Publication (JP-A) No 2015-182496. An airflow is generated around the vehicle body during traveling. Air at a traveling direction side of the vehicle body hits a front surface of the vehicle body, and then is divided toward a side surface and an upper surface of the vehicle body and flows along the side surface and the upper surface of the vehicle body, and airflows join at a rear side of the vehicle body. These airflows are one factor that hinders traveling of the vehicle.

Therefore, for example, a corner portion from a front surface facing a traveling direction of the vehicle body during traveling to a side surface along the traveling direction may be structured to have an inclined surface or a curved surface such that the corner portion does not face the traveling direction in a vehicle such as an automobile, so that an airflow can flow generally along an outer surface of the vehicle body.

However, despite of such measures relating to a shape of the vehicle body, an airflow may not flow in a manner of well following the outer surface of the vehicle body including the corner portion. The airflow may not be prevented from blowing out from the corner portion toward an outer side in a vehicle width direction. The vehicle needs to be improved in order to cause the airflow to flow in a manner of well following the outer surface of the vehicle body.

JP-A No. 2015-166212 discloses that an embossing pattern is formed on an entire outer surface of a front spoiler in order to make scratches on the front spoiler inconspicuous.

Japanese Patent No. 6435434 discloses that a sheet member for reducing air resistance is attached to a surface of a vehicle body.

SUMMARY

An aspect of the present disclosure provides a vehicle including an embossed surface for improving aerodynamic characteristics. The vehicle includes a front bumper member provided at a lower portion of a front surface of a vehicle body of the vehicle. On a surface of a side surface portion of the front bumper member, an embossed surface having a directional pattern for assisting an airflow to direct in one direction along the surface is formed. The one direction is raised rearward relative to a front-rear direction of the vehicle body.

An aspect of the present disclosure provides a front bumper member to be provided at a lower portion of a front surface of a vehicle body of a vehicle. The front bumper member includes an embossed surface formed on a surface of a side surface portion of the front bumper member. The embossed surface includes a directional pattern for assisting an airflow to direct in one direction along the surface. The embossed surface is formed such that the one direction is raised rearward relative to a front-rear direction of the vehicle body.

BRIEF DESCRIPTION OF DRAWINGS

The accompanying drawings are included to provide a further understanding of the disclosure and are incorporated in and constitute a part of the specification. The drawings illustrate an embodiment and, together with the specification, serve to explain the principles of the disclosure.

DESCRIPTION OF EMBODIMENTS

The inventors have tried to form an embossed surface having a directionality along a front-rear direction of a vehicle body on a surface of a corner portion of a front bumper member provided at a front portion of the vehicle body.

According to the embossed surface along the front-rear direction, an airflow flowing along the front-rear direction of the vehicle body is likely to flow in a manner of following an outer surface of the corner portion when the airflow flows on the embossed surface of the corner portion. An airflow that blows out from the corner portion toward an outer side in a vehicle width direction is reduced. A characteristic of the airflow following the outer surface of the vehicle body is improved.

However, it has been newly found that an occupant such as a driver of a vehicle may feel strangeness about, for example, steering stability and steering responsiveness of the vehicle body due to the formation of the embossed surface having the directionality along the front-rear direction of the vehicle body on the surface of the corner portion of the front bumper member.

This strange feeling is not recognized as a remarkable feeling that lowers the steering stability and the steering responsiveness of the vehicle as compared with a case where the embossed surface is not provided, but this strange feeling can be felt, for example, when steering is performed during straight traveling.

As described above, it is desirable to improve an airflow around the vehicle body by the embossed surface in a vehicle, so that an occupant such as a driver of the vehicle does not feel strangeness about, for example, the steering stability and the steering responsiveness of the vehicle body.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1A:
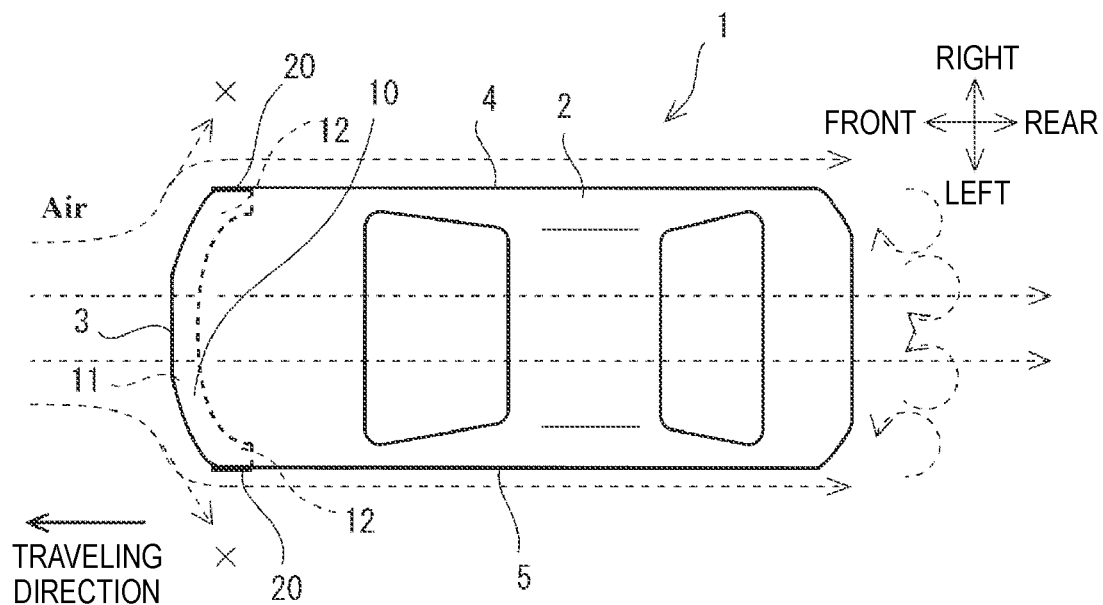
FIG. 1A is a plan view showing an automobile according to an embodiment.

FIG. 1A is a plan view showing an automobile 1 according to an embodiment.

Figure 1B:
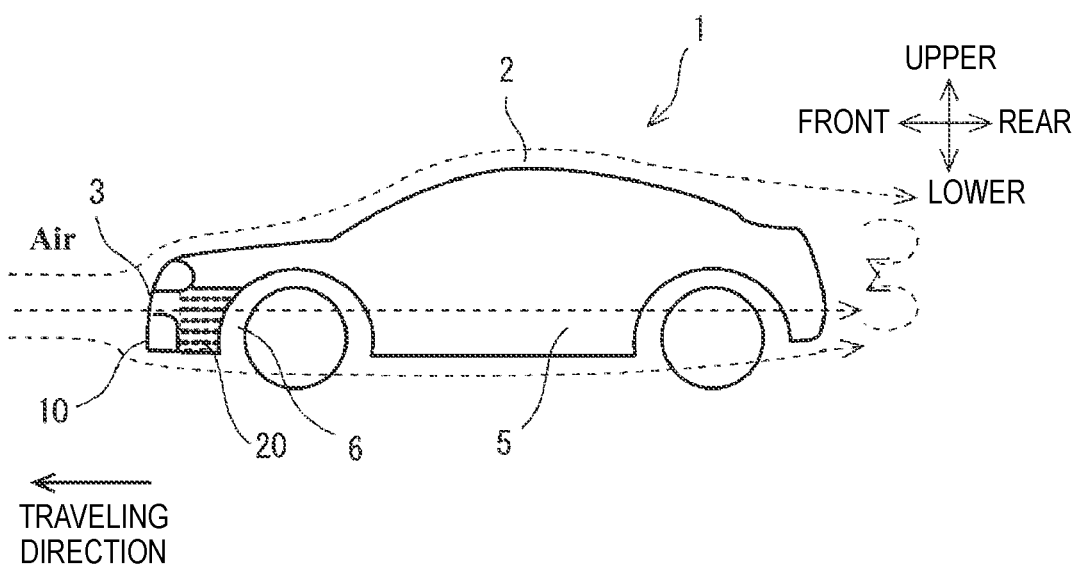
FIG. 1B is a left side view showing the automobile in FIG. 1A.

FIG. 1B is a left side view showing the automobile 1 in FIG. 1A.

The automobile 1 is an example of a vehicle.

The automobile 1 in FIGS. 1A and 1B has a vehicle body 2. The automobile 1 can travel forward or rearward by a manual operation of an occupant or by autonomous driving. The automobile 1 can travel in a right front direction, a left front direction, a right rear direction, and a left rear direction by steering.

Airflows flowing along a shape of the vehicle body 2 are generated around the vehicle body 2 during traveling as indicated by dashed arrows in the drawings. Air at a traveling direction side of the vehicle body 2 hits a front bumper member 10 that is provided on a front surface 3 of the vehicle body 2, and then is divided toward left and right side surfaces 4 and 5 and an upper surface of the vehicle body 2 and flows along the side surfaces 4 and 5 and the upper surface of the vehicle body 2, and airflows join at a rear side of the vehicle body 2. A slight vortex flow is generated at the rear side of the vehicle body 2 due to the entrainment of the airflows. These airflows are one factor that hinders traveling of the automobile 1.

The front bumper member 10 is provided at a lower portion of the front surface 3 of the vehicle body 2. The front bumper member 10 is, for example, a component formed of a resin material.

The front bumper member 10 includes a front surface portion 11 constituting the front surface 3 of the vehicle body 2, and side surface portions 12 at left and right sides of the front surface portion 11 in a vehicle width direction of the vehicle body 2. Each of the side surface portions 12 extends to a wheel house 6 for a front wheel.

Both left and right end portions of the front surface portion 11 of the front bumper member 10 are lowered to a rear side from a central portion. The left and right end portions are inclined surfaces that do not face the traveling direction.

Corner portions where the front face portion 11 and the left and right side surface portions 12 of the front bumper member 10 are connected are formed into a smooth curved surface shape.

Since the front bumper member 10 has such an outer shape, after air at the traveling direction side of the vehicle body 2 hits the front bumper member 10 provided on the front surface 3 of the vehicle body 2, the air is likely to flow along the outer shape of the front bumper member 10. A CD value (Coefficient of Drag value) and the like can be improved.

However, even when the shape of the vehicle body 2 such as the front bumper member 10 is devised, it cannot be said that the airflow flows in a manner of well following the outer surface of the vehicle body 2 including the corner portions.

As indicated by "X" in the drawing, it cannot be said that it is possible to sufficiently prevent an airflow from blowing out from the corner portions toward an outer side in the vehicle width direction. The vehicle needs to be improved in order to cause an airflow to flow in a manner of well following the outer surface of the vehicle body 2.

Therefore, on at least the entire surface of each of the side surface portions 12 of the front bumper member 10, an embossed surface 20 that has a directionality for assisting an airflow to flow along the surface in one direction than in another direction is formed in the present embodiment.

In the present embodiment, the embossed surface 20 having such directionality controls an airflow and improves aerodynamic characteristics of the automobile 1.

Figure 2:
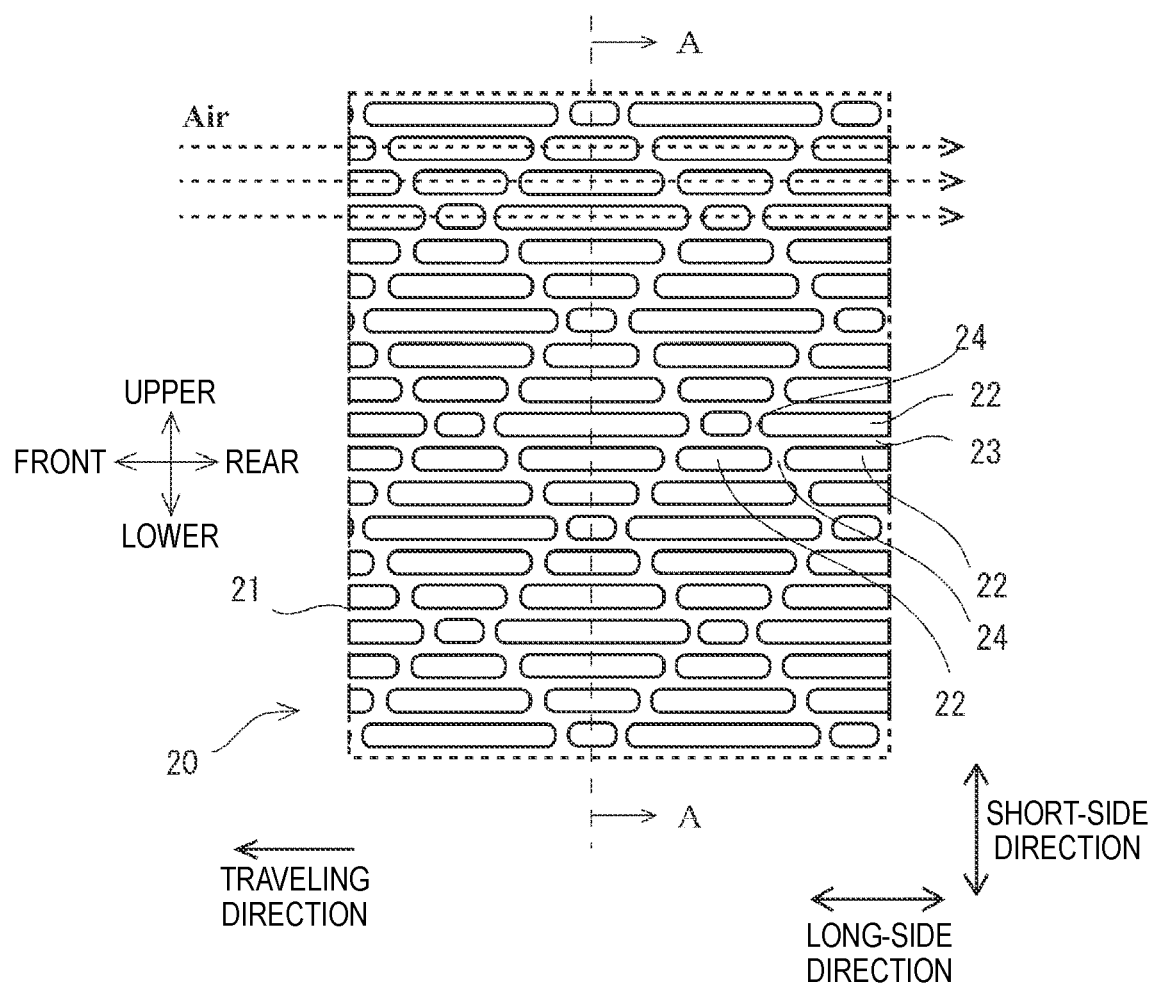
FIG. 2 is a schematic view showing an embossed surface having a directional pattern that can be formed on a front bumper member of the automobile in FIG. 1A.

FIG. 2 is a schematic view showing the embossed surface 20 having the directional pattern that can be formed on the front bumper member 10 of the automobile 1 in FIG. 1A.

The embossed surface 20 in FIG. 2 includes a base surface 21 and a plurality of minute protruding portions 22 formed in a manner of protruding from the base surface 21.

The base surface 21 may be an outer surface of the front bumper member 10. In this case, the embossed surface 20 may be formed simultaneously with the front bumper member 10 during molding of the front bumper member 10. The base surface 21 may be a sheet attached to an outer surface of the front bumper member 10.

The plurality of protruding portions 22 include a plurality of elongated protrusions. Each of the elongated protrusions 22 may have a long elliptical shape with both ends in the longitudinal direction rounded. The elongated protrusion 22 may have, for example, a cubic shape having a quadrangular cross section.

Some of the plurality of protruding portions 22 may not have an elongated shape, and may have, for example, a regular cubic shape or a columnar shape.

The plurality of protruding portions 22 are formed side by side on the entire base surface 21 in a short-side direction and a long-side direction of the elongated shape.

A protruding height of the protruding portion 22 from the base surface 21 may be, for example, several micrometers or more.

First recessed portions 23 which are minute are formed between elongated protrusions 22 among the plurality of protruding portions 22 which are adjacent in the short-side direction of the elongated shape. Each of the first recessed portions 23 linearly extends along the long-side direction of the elongated protrusions 22 on the entire base surface 21.

Second recessed portions 24 which are minute are formed between elongated protrusions 22 among the plurality of protruding portions 22 which are adjacent in the long-side direction of the elongated shape. The second recessed portions 24 are formed in a manner in which one of the second recessed portions 24 is shifted in the long-side direction relative to another of the second recessed portions 24 formed between other elongated protrusions 22 adjacent in the short-side direction of the elongated shape among the plurality of protruding portions 22. In particular, in order to obtain uniform airflow characteristics over the entire base surface 21, the plurality of second recessed portions 24 are formed over the entire base surface 21 in a constant pattern in which the second recessed portions 24 are bent in the short-side direction in the present embodiment. Accordingly, each of the second recessed portions 24 is not formed in a manner of linearly extending over the entire base surface 21 along the short-side direction.

In the embossed surface 20 having such a surface structure, an airflow in a direction along the long-side direction of the elongated protrusions 22 becomes an airflow along the directional pattern, so that the airflow is likely to flow on the embossed surface 20.

On the other hand, an airflow in a direction along the short-side direction of the elongated protrusions 22 is less likely to flow on the embossed surface 20.

As described above, the embossed surface 20 having the directional pattern in FIG. 2 have a directionality in which an airflow flowing along a surface of the embossed surface 20 is likely to flow in one direction and is less likely to flow in another direction.

Figure 3A:
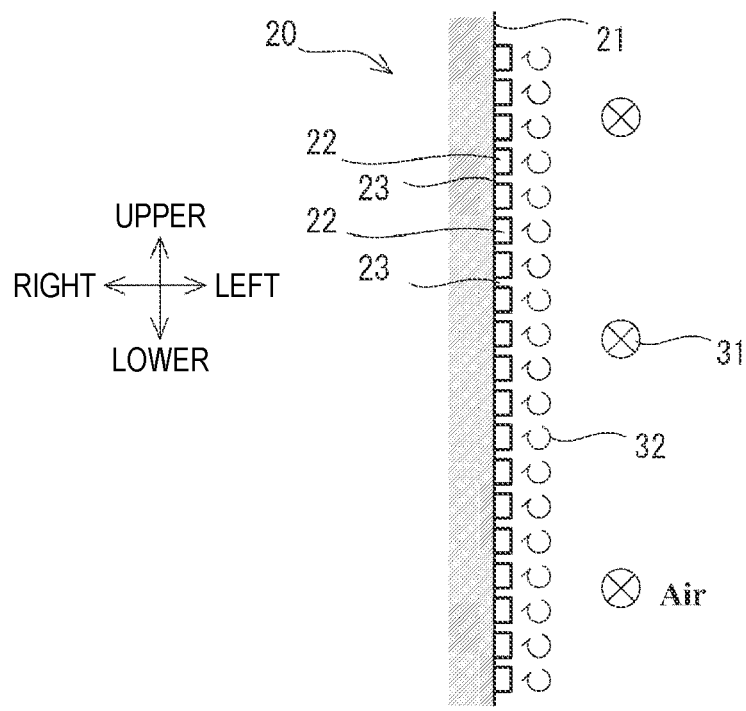
FIG. 3A is a view showing an airflow at a side surface portion of the front bumper member on which the embossed surface having the directional pattern in FIG. 2 is formed.

FIG. 3A is a view showing an airflow at the side surface portion 12 of the front bumper member 10 on which the embossed surface 20 having the directional pattern in FIG. 2 is formed.

FIG. 3A is a schematic view corresponding to A-A cross section of FIG. 2 showing the embossed surface 20 formed on the side surface portion 12 of the front bumper member 10 as viewed from a front side of the automobile 1. In FIG. 3A, an upper-lower direction of the paper surface coincides with the short-side direction of the elongated protrusion 22.

In this case, the embossed surface 20 having the directional pattern for assisting an airflow to flow in a direction along a front-rear direction of the vehicle body 2 is formed over the entire surface of the side surface portion 12 of the front bumper member 10 provided at a front portion of the vehicle body 2.

As shown in FIG. 3A, when an airflow flowing on the side surfaces 4 and 5 of the vehicle body 2 flows on the embossed surface 20, a longitudinal vortex 32 is generated between a main flow 31 that flows along the side surfaces 4 and 5 of the vehicle body 2 and a surface of the embossed surface 20. The longitudinal vortex 32 is formed on a surface of the protruding portion 22 for each protruding portion 22. The flow induced by the longitudinal vortex 32 is less likely to flow into the first recessed portion 23. A contact area between the embossed surface 20 and the airflow is reduced by a width of the first recessed portion 23. Frictional resistance of the airflow relative to the embossed surface 20 is reduced.

Figure 3B:
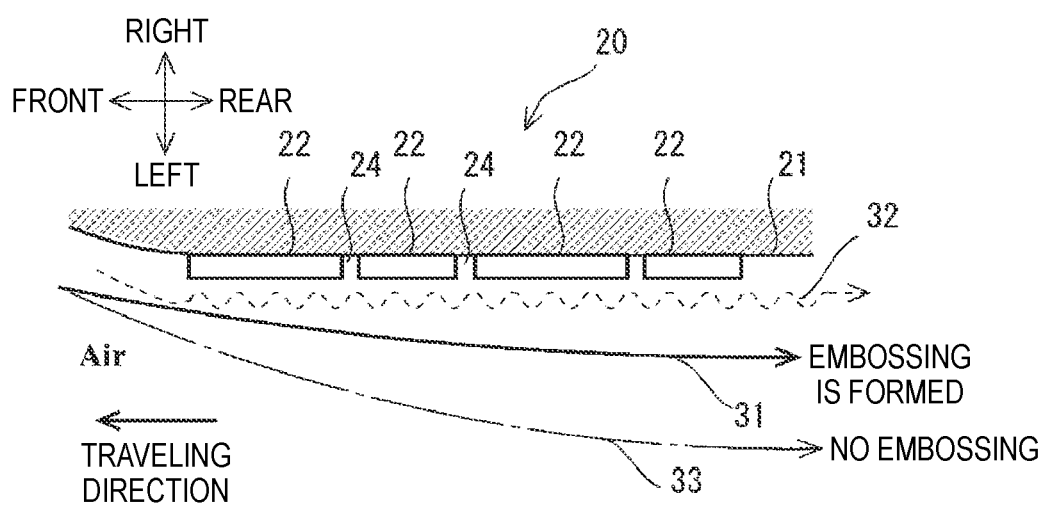
FIG. 3B is a schematic horizontal cross-sectional view showing the side surface portion of the front bumper member on which the embossed surface having the directional pattern in FIG. 3A is formed.

FIG. 3B is a schematic horizontal sectional view showing the side surface portion 12 of the front bumper member 10 on which the embossed surface 20 having the directional pattern in FIG. 3A is formed. The directional pattern of the embossed surface 20 in FIG. 3B is a directional pattern for assisting an airflow to flow in a direction along the front-rear direction of the vehicle body 2. In FIG. 3B, a left-right direction of the paper surface coincides with the long-side direction of the elongated protrusion 22.

Different from the case shown in FIG. 3B, in a case where the embossed surface 20 is not formed on the side surface portion 12 of the front bumper member 10, the main flow 33 that flows along the side surface portion 12 of the front bumper member 10 flows in a manner in which the airflow is slightly separated away from the surface of the side surface portion 12 as indicated by a dash-dot line in the drawing.

On the other hand, when the embossed surface 20 is formed on the side surface portion 12 of the front bumper member 10 as shown in FIG. 3B, the frictional resistance of the airflow relative to the embossed surface 20 is reduced. As a result, the main flow 31 that flows along the side surface portion 12 of the front bumper member 10 flows in a manner in which the airflow is close to the surface of the side surface portion 12 as indicated by a solid line in the drawing.

In this manner, the embossed surface 20 is formed on the side surface portion 12 of the front bumper member 10, and the directionality of the embossed surface 20 in one direction is a direction along the front-rear direction of the vehicle body 2, so that the airflow flows in a manner of well following a surface shape of the side surface portion 12 of the front bumper member 10. It is possible to positively prevent the airflow from blowing out from the corner portions of the front bumper member 10 toward an outer side in the vehicle width direction. The airflow flows in a manner of well following the outer surface of the vehicle body 2.

Figure 4:
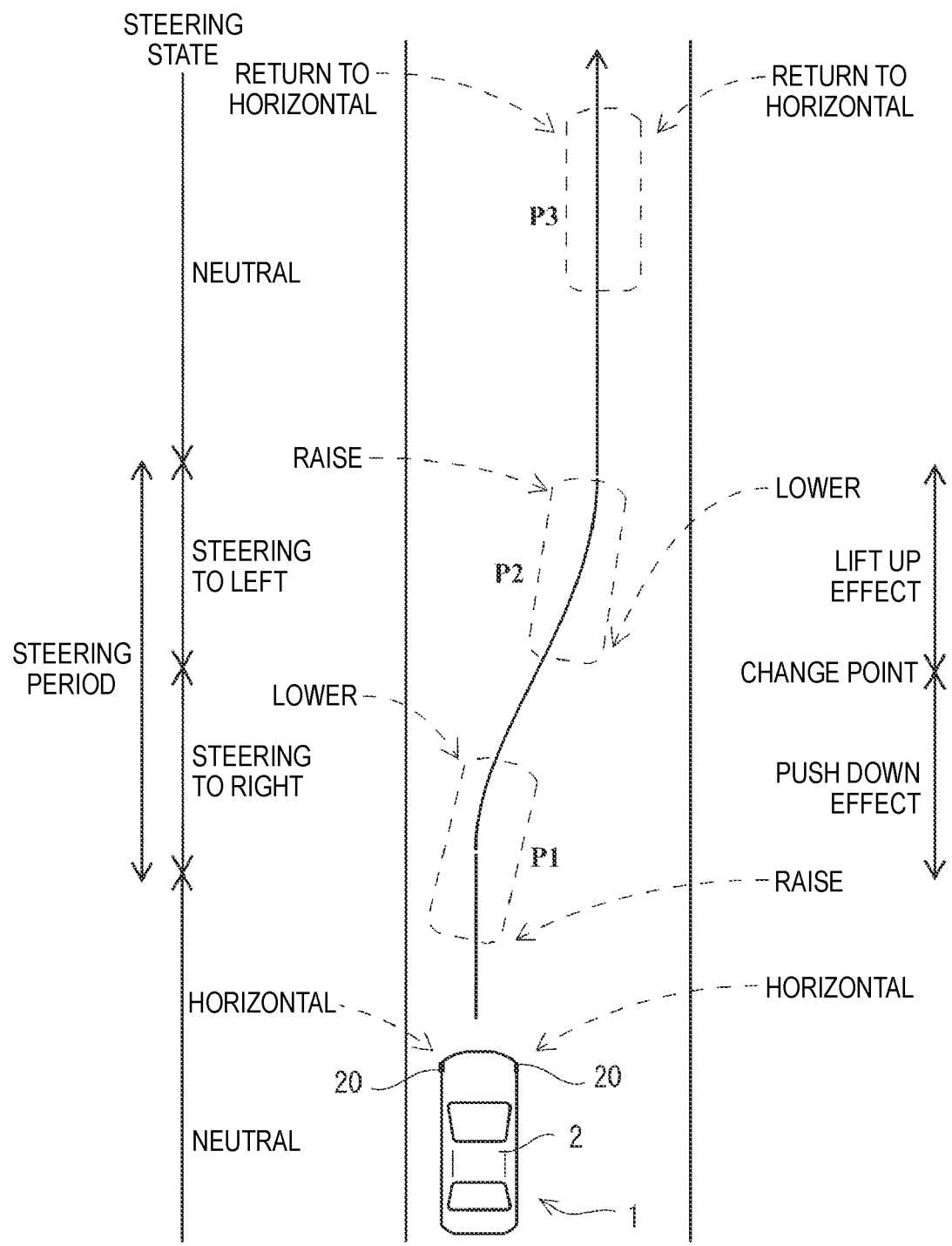
FIG. 4 is a view showing a traveling state of the automobile in which aerodynamic characteristics are improved by the embossed surface in FIG. 3A.

FIG. 4 is a view showing a traveling state of the automobile 1 in which aerodynamic characteristics are improved by the embossed surface 20 in FIG. 3A.

In FIG. 4, the automobile 1 in which the embossed surface 20 having the directional pattern in FIG. 2 is formed on a surface of the side surface portion 12 of the front bumper member 10 as shown in FIG. 3A travels on a straight road.

As shown in FIG. 4, when steering for changing a position of the automobile 1 in the vehicle width direction is performed during straight traveling, the automobile 1 changes a direction to the right at a point P1 during straight traveling, and then changes a direction to the left at a point P2. A posture of the vehicle body is changed during a steering period. At a point P3 after the steering is completed, the automobile 1 returns to travel in a straight traveling direction, and a posture of the vehicle body is stabilized.

Such steering during straight traveling may cause an occupant such as a driver of the automobile 1 to feel strangeness about a behavior of the vehicle body 2, for example, about steering stability and steering responsiveness.

For example, an occupant such as a driver of the automobile 1 may have an strange feeling such as a reduction of a ground contact feeling at the front of vehicle body 2, a reduction in response to steering, a reduction in responsiveness to steering, and a prolongation of a damping property of a posture change of the automobile 1 during steering in straight traveling.

These strange feelings are not recognized as remarkable feelings that lower the steering stability and the steering responsiveness of the automobile 1 as compared with a case where the embossed surface 20 is not provided, and these strange feelings are subtle feelings.

Figure 5:
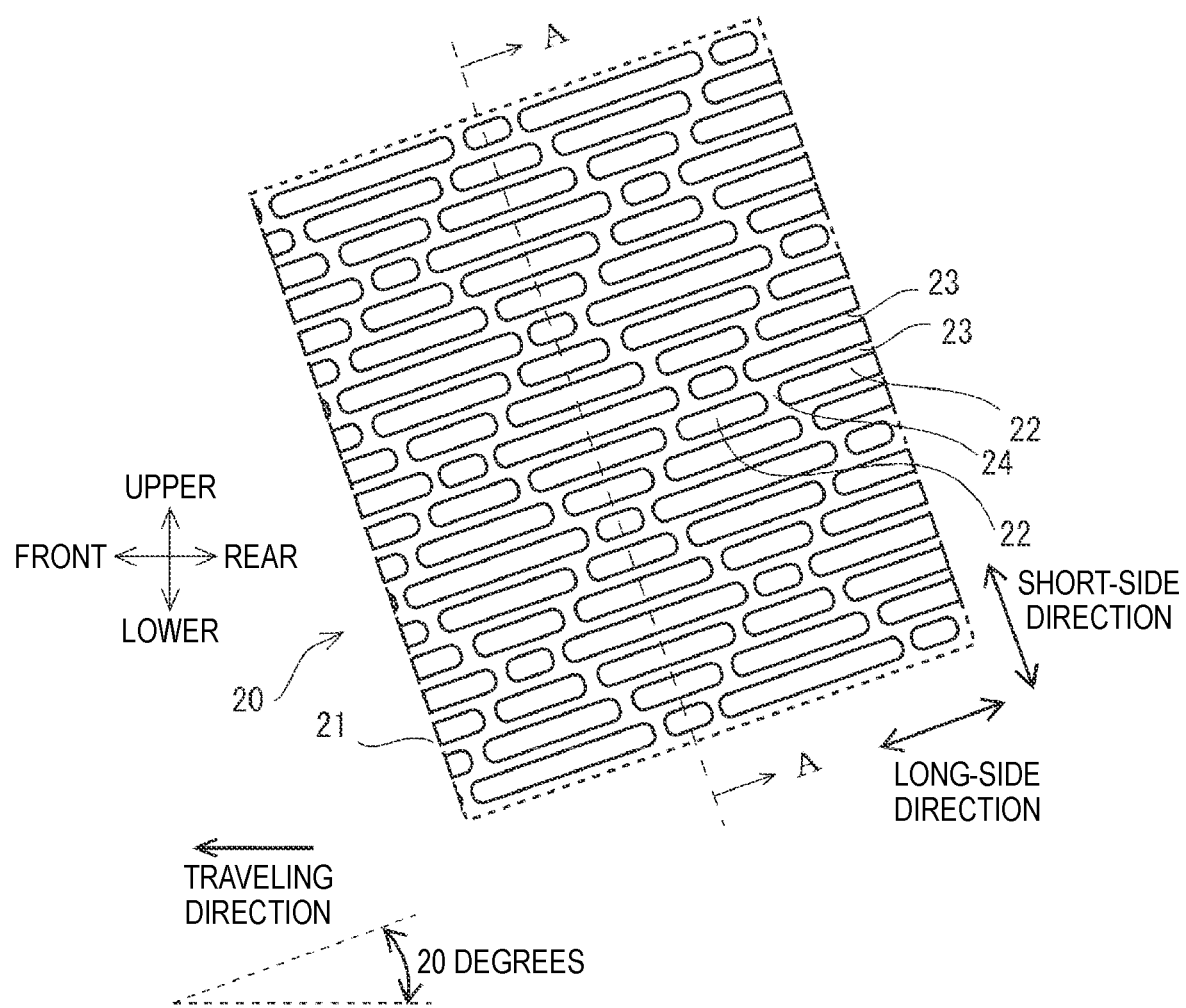
FIG. 5 is a view showing the embossed surface formed on the front bumper member.

FIG. 5 is a view showing the embossed surface 20 formed on the side surface portion 12 of the front bumper member 10 in the present embodiment.

In the present embodiment, as shown in FIG. 5, the embossed surface 20 having the directional pattern in FIG. 2 is formed such that the directionality of the embossed surface 20 in one direction does not have angle of 0 degrees along the front-rear direction of the vehicle body 2 as shown in FIG. 3A, but has a rear raising angle relative to the front-rear direction of the automobile 1.

In one example, the embossed surface 20 is formed such that the first recessed portion 23 that extends linearly in the embossed surface 20 has a rear raising angle of, for example, 20 degrees, relative to the front-rear direction of the vehicle body 2.

The embossed surface 20 is formed on the entire surface of the side surface portion 12 of the front bumper member 10 provided at the front portion of the vehicle body 2.

Accordingly, even when steering or the like is performed during straight traveling, an occupant such as a driver of the automobile 1 does not feel strangeness about the behavior of the vehicle body 2, for example, about the steering stability or the steering responsiveness.

An occupant such as a driver of the automobile 1 does not have a strange feeling such as a reduction of ground contact feeling at the front of vehicle body 2, a reduction in response to steering, a reduction in responsiveness to steering, and a prolongation of a damping property of a posture change of the automobile 1 when steering is performed during straight traveling.

Pitching of the automobile 1 may occur not only during steering but also due to road surface disturbance or the like. The road surface disturbance may occur even when the automobile 1 travels straight. A behavior change of the automobile 1 at the time of such pitching does not give an occupant such as a driver of the automobile 1 an strange feeling.

Although it is difficult to quantitatively describe a cause of such a strange feeling, a qualitative example will be described below.

Figure 6:
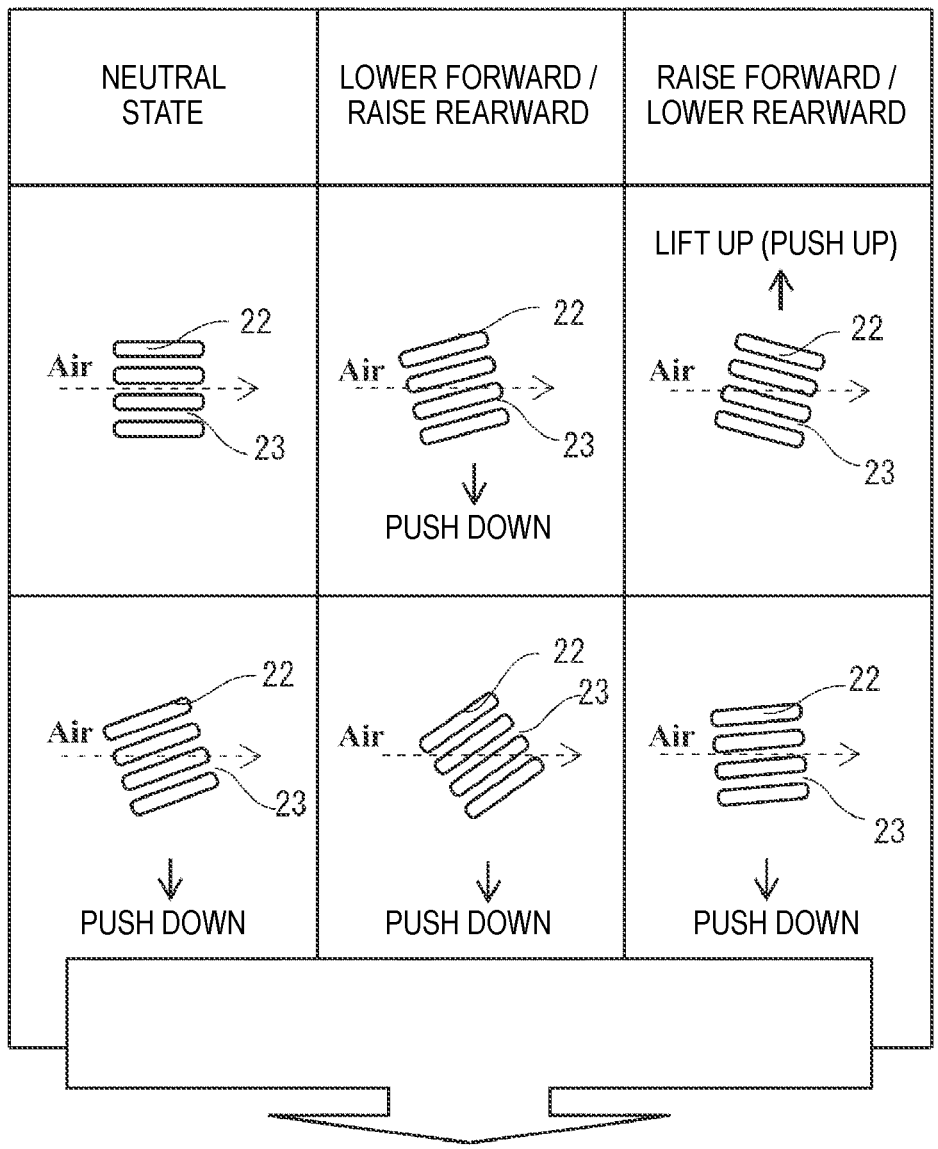
FIG. 6 is a comparative view showing a case where the embossed surface having a directional pattern is formed as shown in FIGS. 3A and 3B and a case where the embossed surface having a directional pattern is formed as shown in FIG. 5.

FIG. 6 is a comparative view showing a case where the embossed surface 20 having a directional pattern is formed as shown in FIG. 2 and a case where the embossed surface 20 having a directional pattern is formed as shown in FIG. 5 according to the present embodiment.

An upper part in FIG. 6 shows a direction change due to a posture change of the vehicle body 2 with respect to the embossed surface 20 having a directionality along the front-rear direction of the vehicle body 2 in FIG. 2.

A lower part shows a direction change due to a posture change of the vehicle body 2 with respect to the embossed surface 20 having a directionality that has a rear raising angle relative to the front-rear direction of the vehicle body 2 as shown in FIG. 5.

In FIG. 6, a plurality of elongated protrusions formed on the embossed surface 20 are arranged side by side in the short-side direction of the protruding portions.

A left part of each stage is a neutral state in which no steering or the like is performed. In the neutral state, the vehicle body 2 may be horizontal and parallel to a road surface.

A center part of each stage is a state in which the vehicle body 2 is lowered forward, that is, raised rearward, due to steering or the like.

The vehicle body 2 is changed from a horizontal posture in the neutral state to a posture in which a pitch is rotated in a forward direction.

A right part of each stage is a state in which the vehicle body 2 is raised forward, that is, lowered rearward, due to steering or the like.

The vehicle body 2 is changed from a horizontal posture in the neutral state to a posture in which a pitch is rotated in a rearward direction.

In the embossed surface 20 having the directionality along the front-rear direction of the vehicle body 2 as shown in the upper part in FIG. 6, the plurality of elongated protrusions have the directionality along the front-rear direction of the vehicle body 2 in the neutral state shown in the left part. In this case, an airflow flowing from a front side to a rear side on the side surfaces 4 and 5 of the vehicle body 2 flows substantially parallel to a longitudinal direction of the protruding portions. Neither a pushing-down force nor a pushing-up force is generated by the airflow on the embossed surface 20.

When a posture of the vehicle body 2 is changed to a posture in which the vehicle body 2 is lowered forward, that is, raised rearward, the plurality of elongated protrusions are in a posture in which the protruding portions are raised rearward relative to a direction along the front-rear direction of the vehicle body 2. In this case, an airflow flowing from the front side to the rear side on the side surfaces 4 and 5 of the vehicle body 2 may generate a pushing-down force on the embossed surface 20.

On the other hand, when a posture of the vehicle body 2 is changed to a posture in which the vehicle body 2 is raised forward, that is, lowered rearward, the plurality of elongated protrusions are in a posture in which the protruding portions are lowered rearward relative to the direction along the front-rear direction of the vehicle body 2. In this case, an airflow flowing from the front side to the rear side on the side surfaces 4 and 5 of the vehicle body 2 may generate a pushing-up force on the embossed surface 20. The pushing-up force is a force for lifting up the vehicle body 2.

In this manner, a force for changing a posture of the vehicle body 2 so as to lift up or push down the vehicle body 2 can be applied in accordance with a change in a posture (pitch) of the vehicle body 2 on the embossed surface 20 having the directionality along the front-rear direction of the vehicle body 2.

In the vehicle body 2 whose posture is changed during steering, for example, as shown in FIG. 4, an outer front side of the vehicle body 2 is lowered, and a rear inner side of the vehicle body 2 is raised in first steering. In second reverse steering, an inner front side of the vehicle body 2 is raised and a rear outer side of the vehicle body 2 is lowered. During a steering period, a change direction of a posture of the vehicle body 2 is switched between an upper side and a lower side.

As a result, a force that pushes down a front portion of the vehicle body 2 acts on the vehicle body 2 in the first steering, and a force that pushes up (a force that lifts up) the front portion of the vehicle body 2 acts on the vehicle body 2 in the second reverse steering. During the steering period, there is a change point where the directionality of the force acting on the vehicle body 2 changes.

Since a behavior manner of the vehicle body 2 changes before and after the change point, it is considered that an occupant such as a driver of the automobile 1 feels strangeness about the behavior of the vehicle body 2, for example, about the steering stability and the steering responsiveness, when steering or the like is performed during straight traveling.

On the embossed surface 20 having a directionality that has a rear raising angle relative to the front-rear direction of the vehicle body 2 shown in the lower part in FIG. 6, in the neutral state shown in the left part, the plurality of elongated protrusions have a directionality that has a rear raising angle relative to the front-rear direction of the vehicle body 2. In this case, an airflow flowing from the front side to the rear side on the side surfaces 4 and 5 of the vehicle body 2 may generate a pushing-down force on the embossed surface 20.

When a posture of the vehicle body 2 is changed to a posture in which the vehicle body 2 is lowered forward, that is, raised rearward, the plurality of elongated protrusions are in a posture in which the protruding portions are raised rearward at a large angle relative to the direction along the front-rear direction of the vehicle body 2. In this case, an airflow flowing from the front side to the rear side on the side surfaces 4 and 5 of the vehicle body 2 may generate a pushing-down force on the embossed surface 20.

When a posture of the vehicle body 2 is changed to a posture in which the vehicle body 2 is raised forward, that is, the vehicle body 2 is lowered rearward, the plurality of elongated protrusions are in a posture in which the protruding portions are raised rearward at a small angle relative to the direction along the front-rear direction of the vehicle body 2.

In this case, an airflow flowing from the front side to the rear side on the side surfaces 4 and 5 of the vehicle body 2 may generate a pushing-down force on the embossed surface 20.

As described above, on the embossed surface 20 having the directionality that has a rear raising angle relative to the front-rear direction of the vehicle body 2, even when a posture (pitch) of the vehicle body 2 is changed, a force for pushing down the vehicle body 2 continues to act on the vehicle body 2 while constantly maintaining a state of having a rear raising angle relative to the front-rear direction of the vehicle body 2.

Even when steering is repeatedly performed, a direction of a force acting on the vehicle body 2 during the steering period is maintained in a direction of pushing down the vehicle body 2, and it is difficult to change the direction of the force.

Since there is no change point, a behavior manner of the vehicle body 2 may continue to be continuous. An occupant such as a driver of the automobile 1 does not feel strangeness about the behavior of the vehicle body 2, for example, about the steering stability and the steering responsiveness, when steering or the like is performed during straight traveling.

As described above, in the present embodiment, the embossed surface 20 having the directional pattern in which an airflow is more likely to flow in one direction along the surface than in another direction is formed on the entire surface of the side surface portion 12 of the front bumper member 10 provided at a lower portion of the front surface 3 of the vehicle body 2. The embossed surface 20 is formed such that the one direction in which the airflow is likely to flow is raised rearward relative to the front-rear direction of the vehicle body 2. Accordingly, similar to a case in which the embossed surface 20 is formed such that the one direction is the front-rear direction of the vehicle body 2, the airflow is likely to flow in a manner of following the shape of the side surface portion 12 of the front bumper member 10. After the air at a traveling direction side of the vehicle body 2 hits the front surface 3 of the vehicle body 2 and flows toward the side surfaces 4 and 5 of the vehicle body 2, the airflow is less likely to blow out from a corner portion of the vehicle body 2 toward an outer side in the vehicle width direction. The air at the traveling direction side of the vehicle body 2 is likely to flow in a manner of following the shape of the vehicle body 2 including the corner portion of the vehicle body 2.

In the present embodiment, the embossed surface 20 is formed such that the one direction in which an airflow is likely to flow is not the front-rear direction of the vehicle body 2, but a direction raised rearward relative to the front-rear direction of the vehicle body 2. Accordingly, for example, even when steering is performed during straight traveling of the automobile 1, an occupant such as a driver of the automobile 1 is less likely to have an strange feeling about, for example, the steering stability and the steering responsiveness of the vehicle body 2.

This is because that the one direction of the embossed surface 20 is formed in a manner of being raised rearward relative to the front-rear direction of the vehicle body 2, so that even when a posture of the vehicle body 2 is changed to an inclined posture due to steering in straight traveling, the one direction of the embossed surface 20 can be maintained in a state in which the one direction of the embossed surface 20 is raised rearward relative to the front-rear direction of the vehicle body 2, or can be maintained in a state in which the one direction of the embossed surface 20 is at least substantially the front-rear direction of the vehicle body 2. This is because that an airflow that flows in a manner of following an outer surface of the vehicle body 2 in accordance with the directionality of the embossed surface 20 during straight traveling can continue to maintain the same flow as before even when a posture of the vehicle body 2 is changed by steering. This is because that even when the vehicle body 2 returns to straight traveling after a posture of the vehicle body 2 is changed by steering, the airflow that flows in a manner of following the outer surface of the vehicle body 2 in accordance with the directionality of the embossed surface 20 during the posture change can continue to maintain the same flow as before.

As a result, even at the time of steering during straight traveling, a ground contact feeling at the front of the vehicle body 2 can be stabilized, a response to steering can be stably improved, responsiveness to steering can be improved, and a damping property of a posture change of the automobile 1 can be improved in the present embodiment. An occupant such as a driver of the automobile 1 is less likely to feel strangeness about the steering stability, the steering responsiveness, and the like of the vehicle body 2.

On the other hand, for example, in a case where the one direction of the embossed surface 20 is formed in a manner in which the one direction is along the front-rear direction of the vehicle body 2 or is formed in a manner in which the one direction is lowered rearward relative to the front-rear direction of the vehicle body 2, when a posture of the vehicle body 2 is changed by steering during straight traveling, the directionality of the embossed surface 20 may be changed so as to be lowered rearward or raised rearward relative to the front-rear direction of the vehicle body 2 in accordance with the posture change. When the directionality of the embossed surface 20 is changed in such a manner, a direction of an airflow flowing on the embossed surface 20 is changed to be upward or downward. The direction of the airflow is changed in a disturbed manner. When such a change of the airflow occurs due to steering during straight traveling, a force for changing a posture of the vehicle body 2 so as to lift up or push down the vehicle body 2 acts on the vehicle body 2 whose posture is changed by steering. As a result, an occupant such as a driver of the automobile 1 feels strangeness about, for example, the steering stability and the steering responsiveness of the vehicle body 2, when steering or the like is performed during straight traveling. An occupant such as a driver of the automobile 1 has an strange feeling such as a reduction of a ground contact feeling at the front of vehicle body 2, a reduction in response to steering, a reduction in responsiveness to steering, and a prolongation of a damping property of a posture change of the automobile 1 when steering is performed during straight traveling. In contrast thereto, in accordance with the embodiments, an occupant such as a driver of the automobile 1 does not feel strangeness due to a behavior change of the automobile 1 not only at the time of pitching of the automobile 1 during steering but also at the time of pitching due to road surface disturbance or the like.

The above-described effects can be obtained without greatly changing an exterior design (shape) of the vehicle body 2 or adding a large aerodynamic part to the vehicle body 2 in the present embodiment.

The embodiment described above is an example of a preferred embodiment of the present disclosure, the present disclosure is not limited thereto, and various modifications or changes can be made without departing from the gist of the disclosure.

For example, in the embodiment described above, the embossed surface 20 having the directional pattern is formed on the surface of the side surface portion 12 of the front bumper member 10 provided at the lower portion of the front surface 3 of the vehicle body 2.

On the other hand, for example, the embossed surface 20 having the directional pattern may be formed on a surface of the side surface portion 12 and on a surface of the front surface portion 11 of the front bumper member 10. The embossed surface 20 that does not have the directional pattern may be formed on the surface of the front surface portion 11 of the front bumper member 10.

Since the embossed surface 20 having the directional pattern is formed on at least the surface of the side surface portion 12 of the front bumper member 10, the same effects as those in the embodiment described above can be achieved.

In the embodiment described above, the directionality of the embossed surface 20 is formed such that one direction of the embossed surface 20 is raised rearward at an angle of 20 degrees relative to the front-rear direction of the vehicle body 2.

On the other hand, for example, the directionality of the embossed surface 20 may be formed such that one direction of the embossed surface 20 has an angle at which one direction of the embossed surface 20 can be maintained to be raised rearward during a posture change of the vehicle body 2 that may occur during normal traveling of the automobile 1.

For example, the directionality of the embossed surface 20 may be formed such that one direction of the embossed surface 20 is raised rearward at an angle larger than 20 degrees.

For example, the directionality of the embossed surface 20 may be formed such that one direction of the embossed surface 20 is raised rearward at an angle in a range of 10 degrees or more and 40 degrees or less.

What is claimed is:

1. A vehicle including an embossed surface for improving aerodynamic characteristics, the vehicle comprising:
    a front bumper member provided at a lower portion of a front surface of a vehicle body of the vehicle,
    wherein on a surface of a side surface portion of the front bumper member, an embossed surface including a directional pattern for assisting an airflow to direct in one direction along the surface is formed, and
    wherein the one direction is raised rearward relative to a front-rear direction of the vehicle body.

2. The vehicle according to claim 1, wherein the embossed surface includes protruding portions that protrude from a base surface,
    wherein the protruding portions includes elongated protrusions each having an elongated shape,
    wherein the elongated protrusions respectively have short-sides and long-sides, the short-sides of the elongated protrusions direct in a first direction, and the long-sides of the elongated protrusions direct in a second direction,
    wherein a first recessed portion that linearly extend along the second direction is formed between first ones of the elongated protrusions, the first ones of the elongated protrusions being adjacent each other in the first direction, and
    wherein the first recessed portions linearly extend at an angle raised rearward relative to the front-rear direction of the vehicle body.

3. The vehicle according to claim 2, wherein second recessed portions are formed between second ones of the elongated protrusions, the second ones of the elongated protrusions being adjacent each other in the second direction, and
    one of the second recessed portions is shifted with respect to another one of the second recessed portions in the second direction.

4. The vehicle according to claim 2, wherein the second recessed portions are formed in a pattern in which the second recessed portions are bent in the first direction.

5. The vehicle according to claim 3, wherein the second recessed portions are formed in a pattern in which the second recessed portions are bent in the first direction.

6. The vehicle according to claim 1, wherein the embossed surface is formed such that the one direction is maintained in a state of being raised rearward relative to the front-rear direction of the vehicle body even when a posture of the vehicle body is changed during traveling.

7. The vehicle according to claim 2, wherein the embossed surface is formed such that the one direction is maintained in a state of being raised rearward relative to the front-rear direction of the vehicle body even when a posture of the vehicle body is changed during traveling.

8. The vehicle according to claim 3, wherein the embossed surface is formed such that the one direction is maintained in a state of being raised rearward relative to the front-rear direction of the vehicle body even when a posture of the vehicle body is changed during traveling.

9. The vehicle according to claim 4, wherein the embossed surface is formed such that the one direction is maintained in a state of being raised rearward relative to the front-rear direction of the vehicle body even when a posture of the vehicle body is changed during traveling.

10. The vehicle according to claim 5, wherein the embossed surface is formed such that the one direction is maintained in a state of being raised rearward relative to the front-rear direction of the vehicle body even when a posture of the vehicle body is changed during traveling.

11. A front bumper member to be provided at a lower portion of a front surface of a vehicle body of a vehicle, the front bumper member comprising:
    an embossed surface formed on a surface of a side surface portion of the front bumper member,
    wherein the embossed surface includes a directional pattern for assisting an airflow to direct in one direction along the surface,
    wherein the embossed surface is formed such that the one direction is raised rearward relative to a front-rear direction of the vehicle body.

12. The front bumper member according to claim 11, wherein the embossed surface includes protruding portions that protrude from a base surface,
    wherein the protruding portions includes elongated protrusions each having an elongated shape,
    wherein the elongated protrusions respectively have short-sides and long-sides, the short-sides of the elongated protrusions direct in a first direction, and the long-sides of the elongated protrusions direct in a second direction, wherein a first recessed portion that linearly extend along the second direction is formed between first ones of the elongated protrusions, the first ones of the elongated protrusions being adjacent each other in the first direction, and wherein the first recessed portions linearly extend at an angle raised rearward relative to the front-rear direction of the vehicle body.

13. The front bumper member according to claim 12, wherein second recessed portions are formed between second ones of the elongated protrusions, the second ones of the elongated protrusions being adjacent each other in the second direction, and one of the second recessed portions is shifted with respect to another one of the second recessed portions in the second direction.

14. The front bumper member according to claim 12, wherein the second recessed portions are formed in a pattern in which the second recessed portions are bent in the first direction.

15. The front bumper member according to claim 13, wherein the second recessed portions are formed in a pattern in which the second recessed portions are bent in the first direction.

16. The front bumper member according to claim 11, wherein the embossed surface is formed such that the one direction is maintained in a state of being raised rearward relative to the front-rear direction of the vehicle body even when a posture of the vehicle body is changed during traveling.

17. The front bumper member according to claim 12, wherein the embossed surface is formed such that the one direction is maintained in a state of being raised rearward relative to the front-rear direction of the vehicle body even when a posture of the vehicle body is changed during traveling.

18. The front bumper member according to claim 13, wherein the embossed surface is formed such that the one direction is maintained in a state of being raised rearward relative to the front-rear direction of the vehicle body even when a posture of the vehicle body is changed during traveling.

* * * * *